(12) United States Patent
Xue et al.

(10) Patent No.: US 10,462,733 B2
(45) Date of Patent: Oct. 29, 2019

(54) STORING WI-FI AND CELLULAR TOWER DATABASE TO ASSIST CELLULAR NETWORK SYSTEM SELECTION

(71) Applicant: BlackBerry Limited, Waterloo (CA)

(72) Inventors: Hao Xue, Ottawa (CA); Jeffrey William Wirtanen, Ottawa (CA); Jean-Philippe Paul Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 113 days.

(21) Appl. No.: 14/558,264

(22) Filed: Dec. 2, 2014

(65) Prior Publication Data

US 2016/0157168 A1 Jun. 2, 2016

(51) Int. Cl.
- *H04W 48/18* (2009.01)
- *H04W 72/10* (2009.01)
- *H04L 29/12* (2006.01)
- *H04W 4/029* (2018.01)
- *H04W 84/12* (2009.01)

(52) U.S. Cl.
CPC ......... *H04W 48/18* (2013.01); *H04L 61/6022* (2013.01); *H04W 4/029* (2018.02); *H04W 72/10* (2013.01); *H04W 84/12* (2013.01)

(58) Field of Classification Search
CPC ..... H04W 48/16; H04W 48/18; H04W 48/20; H04W 4/02; H04W 4/025; H04W 64/00; Y02B 60/50
See application file for complete search history.

(56) References Cited

U.S. PATENT DOCUMENTS

| | | | |
|---|---|---|---|
| 2007/0129103 A1* | 6/2007 | Al-Shaikh | H04M 1/72522 455/551 |
| 2007/0230420 A1* | 10/2007 | Bumiller | H04W 48/18 370/338 |
| 2008/0235762 A1 | 9/2008 | Gutta | |
| 2008/0310371 A1* | 12/2008 | Russell | H04W 36/0066 370/331 |
| 2010/0008552 A1 | 1/2010 | Shin et al. | |
| 2011/0116453 A1* | 5/2011 | Huang | H04W 48/18 370/329 |
| 2013/0007039 A1* | 1/2013 | Edara | H04W 48/16 707/769 |

(Continued)

FOREIGN PATENT DOCUMENTS

WO 2012/142166 A1 10/2012

OTHER PUBLICATIONS

Le Hoang; "How do I turn WiFi on or off automatically at a specific time on my galaxy S5." Aug. 7, 2014.*

(Continued)

*Primary Examiner* — Marsha D Banks Harold
*Assistant Examiner* — Elton Williams
(74) *Attorney, Agent, or Firm* — Moffat & Co

(57) ABSTRACT

A method of selecting a cellular network includes storing a location database in a memory of a mobile device, the location database providing location data for one or more locations each identified by a unique identifier, in response to recognizing the identifier, determining a current location of the mobile device by looking up the identifier in the database, prioritizing bands based on the current location to define a band priority, and selecting the cellular network based on the band priority.

14 Claims, 6 Drawing Sheets

(56) References Cited

U.S. PATENT DOCUMENTS

| | | | |
|---|---|---|---|
| 2014/0140586 A1 | 5/2014 | Case | |
| 2014/0256317 A1* | 9/2014 | Zhao | H04W 48/10 |
| | | | 455/434 |
| 2015/0043362 A1* | 2/2015 | Sankar | G01S 5/02 |
| | | | 370/252 |

OTHER PUBLICATIONS

European Patent Office, Extended European Search Report on Application No. 15197649.5, dated Mar. 10, 2016.
3rd Generation Partnership Project, "3rd Generation Partnership Project; Technical Specification Group Core Network and Terminals; Non-Access-Stratum (NAS) functions related to Mobile Station (MS) in idle mode (Release 12)", 3GPP Draft; 3GPP TS 23.122, V12.5.0, Jun. 26, 2014.
Seungjune Yi et al.,"Idle Mode Procedure", in: "Radio protocols for LTE and LTE advanced", ISBN: 978-1-118-18853-8, Nov. 30, 2012.
European Patent Office, Office Action for Application No. 15197649.5 dated Feb. 3, 2017.
EPO, Oral Proceeding Summary for Application #15197649.5, dated Jun. 30, 2017.

\* cited by examiner

STORING WI-FI AND CELLULAR TOWER DATABASE TO ASSIST CELLULAR NETWORK SYSTEM SELECTION

TECHNICAL FIELD

The present disclosure relates generally to wireless communications and, in particular, to cellular network selection techniques.

BACKGROUND

When a cellular radiofrequency transceiver of a mobile device is activated, the mobile device seeks to acquire a suitable wireless network in order to obtain voice and data services. System selection algorithms enable the mobile device to find the optimal wireless network under various conditions.

In General Packet Radio Service (GPRS), Universal Mobile Telecommunication System (UMTS) and Long-Term Evolution (LTE) cellular network systems, a public land mobile network (PLMN) list is normally used for the system selection. The PLMN list contains a list of networks mobile country code (MCC) and mobile network code (MNC) with a priority order. The PLMN list combined with access technology are typically stored in a subscriber identity module (SIM) or universal subscriber identity module (USIM) card.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
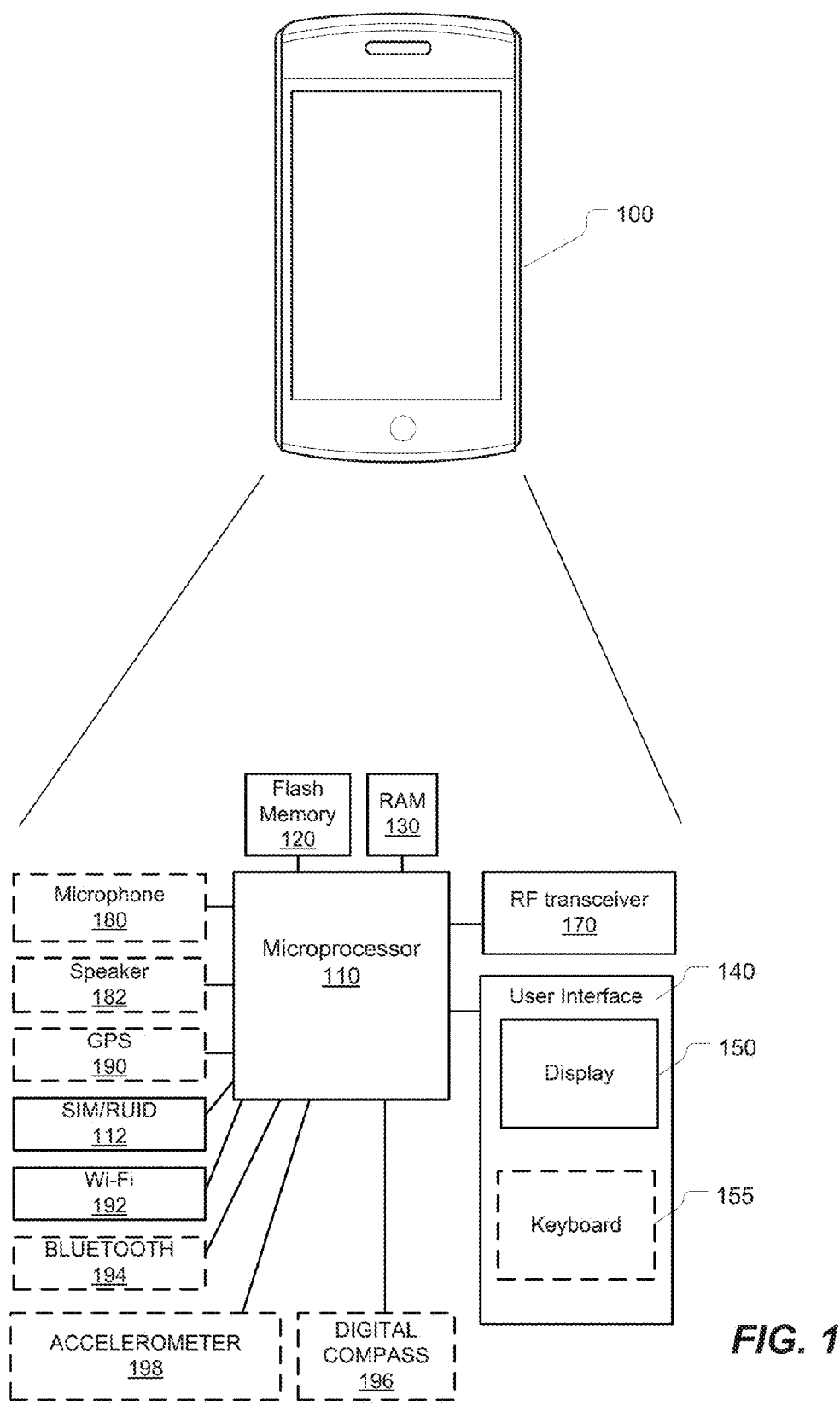
FIG. 1 is a depiction of a mobile device implementing the present disclosure.

On activation of a cellular transceiver, the mobile device scans all the channels within GPRS or UMTS or LTE band groups until a suitable system is found. It is desirable for the system selection algorithm to find a usable cellular network quickly in order to prolong battery life and to provide a good user experience.

However, mobile devices today need to scan an ever-growing set of bands and radio access technologies (RATs). Currently, LTE uses 11 bands, UMTS uses 7 bands and GSM uses 4 bands. This scan can take a significant amount of time to complete while also depleting the battery. A technique to assist cellular network selection is therefore highly desirable.

The present disclosure provides a technique for selecting a cellular network by using a stored or pre-loaded location database that includes the locations of Wi-Fi access points and corresponding information for cellular base stations (cell towers). After powering on or activating the cellular radiofrequency transceiver, the mobile device scans for a Wi-Fi signal. If a Wi-Fi signal is detected, the mobile device obtains a media access control (MAC) address of the broadcasting wireless access point from the Wi-Fi signal and then searches the database for the location of the Wi-Fi access point by using the obtained MAC address. This location is used as the current location of the mobile device. The current location is then used to prioritize the band search, thereby expediting the process of finding a desired cellular network.

Accordingly, one aspect of the present disclosure is a method of selecting a cellular network that includes storing a location database in a memory of a mobile device, the location database providing location data for one or more locations each identified by a unique identifier, in response to recognizing the identifier, determining a current location of the mobile device by looking up the identifier in the database, prioritizing bands based on the current location to define a band priority, and selecting the cellular network based on the band priority.

Another aspect of the present disclosure is a non-transitory computer-readable medium comprising instructions in code which when loaded into a memory and executed by a processor of a mobile device cause the mobile device to store a location database in a memory of a mobile device, the location database providing location data for one or more locations each identified by a unique identifier, in response to recognizing the identifier, determine a current location of the mobile device by looking up the identifier in the database, prioritize bands based on the current location to define a band priority, and select the cellular network based on the band priority.

Another aspect of the present disclosure is a mobile device having a memory for storing a location database that includes location data for one or more locations each identified by a unique identifier, a processor operatively coupled to the memory to in response to recognizing the identifier, determine a current location of the mobile device by looking up the identifier in the database, prioritize bands based on the current location to define a band priority and select the cellular network based on the band priority.

The details and particulars of these aspects of the disclosure will now be described below, by way of example, with reference to the drawings.

In general, this disclosure may be implemented by a mobile device (i.e., a mobile communications device or wireless communications device) having a cellular radiofrequency transceiver as well as a Wi-Fi transceiver. The mobile device stores a location database (or geolocation database) that includes location data for Wi-Fi access points. The location information may comprise location coordinates or the identity of nearby cell towers with which a mobile country code (MCC) is associated. On powering on or activating the cellular transceiver, the mobile device may detect a beacon signal from a Wi-Fi access point (WAP). The beacon signal contains a MAC address of the WAP. The mobile device extracts the MAC address and looks up the MAC address in the database to determine a location of the broadcasting WAP. Since the effective range of a wireless access point (WAP) is relatively small, this provides an approximate current location of the mobile device (with an error of less than the effective range), which is sufficient for reordering or prioritizing the bands for more efficient searching.

FIG. 1 is a depiction of a mobile device implementing an embodiment of the present disclosure. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard or keypad. The user interface may also include an optical jog pad and/or a thumbwheel, trackball, track pad or equivalent.

As depicted by way of example in FIG. 1, the mobile device 100 may include a cellular radiofrequency (RF) transceiver 170 for communicating with other devices. The cellular radiofrequency transceiver 170 enables wireless communication with one or more base stations over a cellular wireless network using cellular communication protocols and standards for both voice calls and packet data transfer such as GSM, CDMA, GPRS, EDGE, UMTS, LTE, etc.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 optionally includes a position-determining subsystem such as a global navigation satellite system (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites.

The mobile device 100 includes a Wi-Fi transceiver 192 for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification.

The mobile device 100 optionally includes a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or accelerometer 198. Other sensors may include a tilt sensor, gyroscope or equivalent.

The mobile device 100 may comprise a wireless communications device, tablet, personal digital assistant, cell phone, smart phone, smart watch, smart accessory, gaming device or any other portable electronic device that has cellular transceiver and a Wi-Fi receiver.

Figure 2:
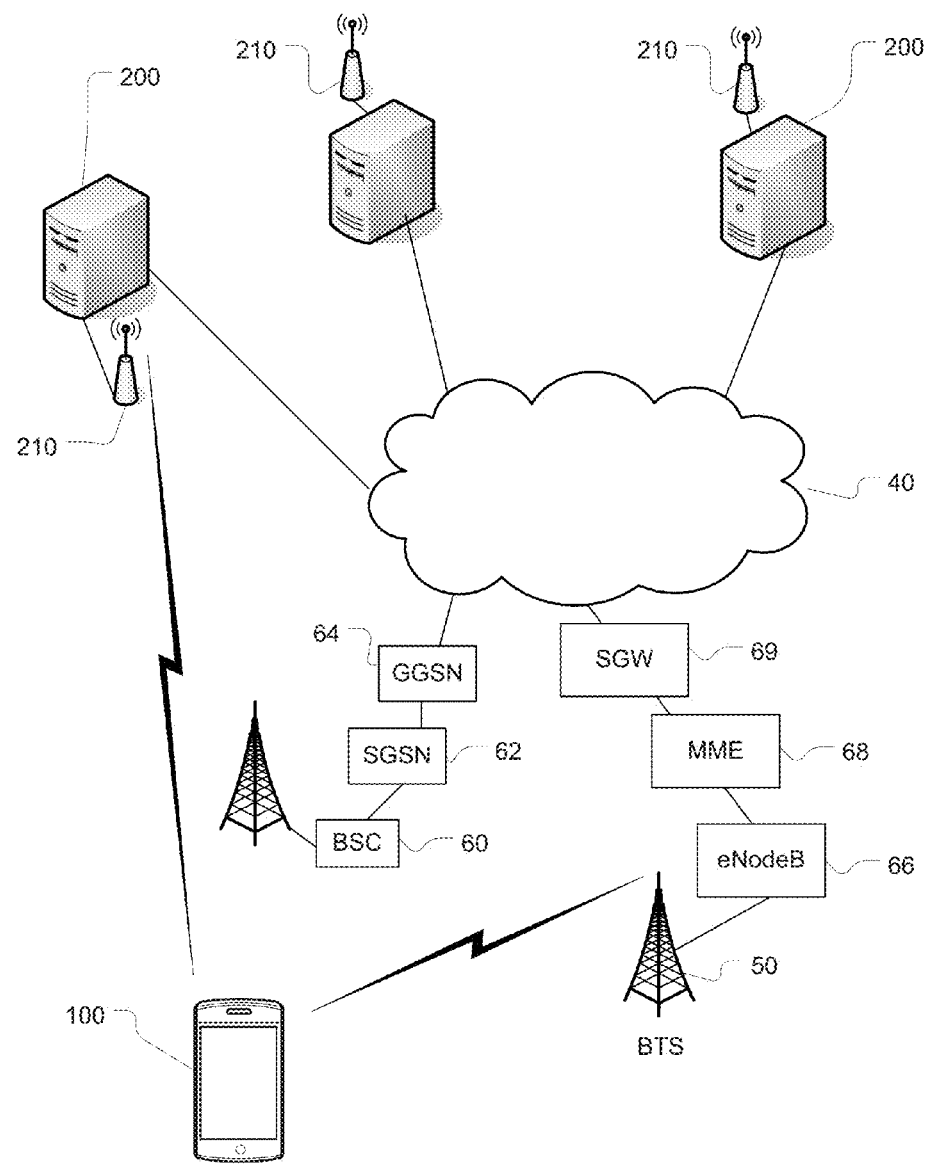
FIG. 2 is a depiction of a system implementing the present disclosure.

In the embodiment depicted by way of example in FIG. 2, the mobile device 100 detects a Wi-Fi beacon signal using the Wi-Fi transceiver 192 of the mobile device 100 that is broadcast by a Wi-Fi access point 210. The mobile device 100 identifies the broadcasting access point by extracting the MAC address from the beacon frame of the beacon signal and searching a database stored in a memory of the mobile device for the location associated with the MAC address. The database stores the locations of access points by listing their MAC addresses. This provides an approximation for the current location of the mobile device. Using this current location the mobile device can reorder or prioritize the bands and then efficiently search the bands for a desired cellular network. The Wi-Fi access point 210 is connected to a server 200 or other computing device that is connected to a data network 40 such as the Internet. Once the desired cellular network is identified, the mobile device 100 connects to the cellular network via a base transceiver station (BTS) 50, base station controller (BSC) 60, Serving GPRS Support Node (SGSN) 62, and Gateway GPRS Support Node (GGSN) 64. In an LTE implementation, the mobile device connects via an eNodeB 66, mobility management entity (MME) 68 and serving gateway (SGW) 69. Using this band-prioritization technology the mobile device expedites network selection. Furthermore, embodiments of the present disclosure may advantageously conserve power and prolong the battery life of the mobile device.

Figure 3A:
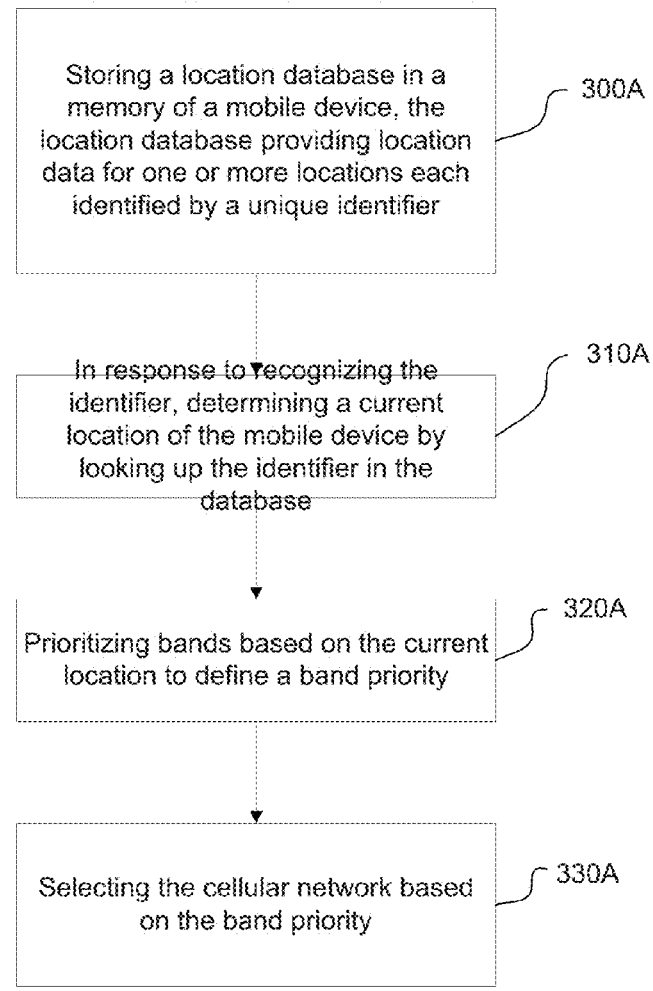
FIG. 3A is a flowchart outlining a method for selection of a cellular network.

A network-selection method is outlined by way of example in FIG. 3A. The method entails a step, act or operation of storing (300A) a location database in a memory of a mobile device, the location database providing location data for one or more locations each identified by a unique identifier, in response to recognizing the identifier, determining (330A) a current location of the mobile device by looking up the identifier in the database, prioritizing (340A) bands based on the current location to define a band priority, and selecting (350A) the cellular network based on the band priority.

Figure 3B:
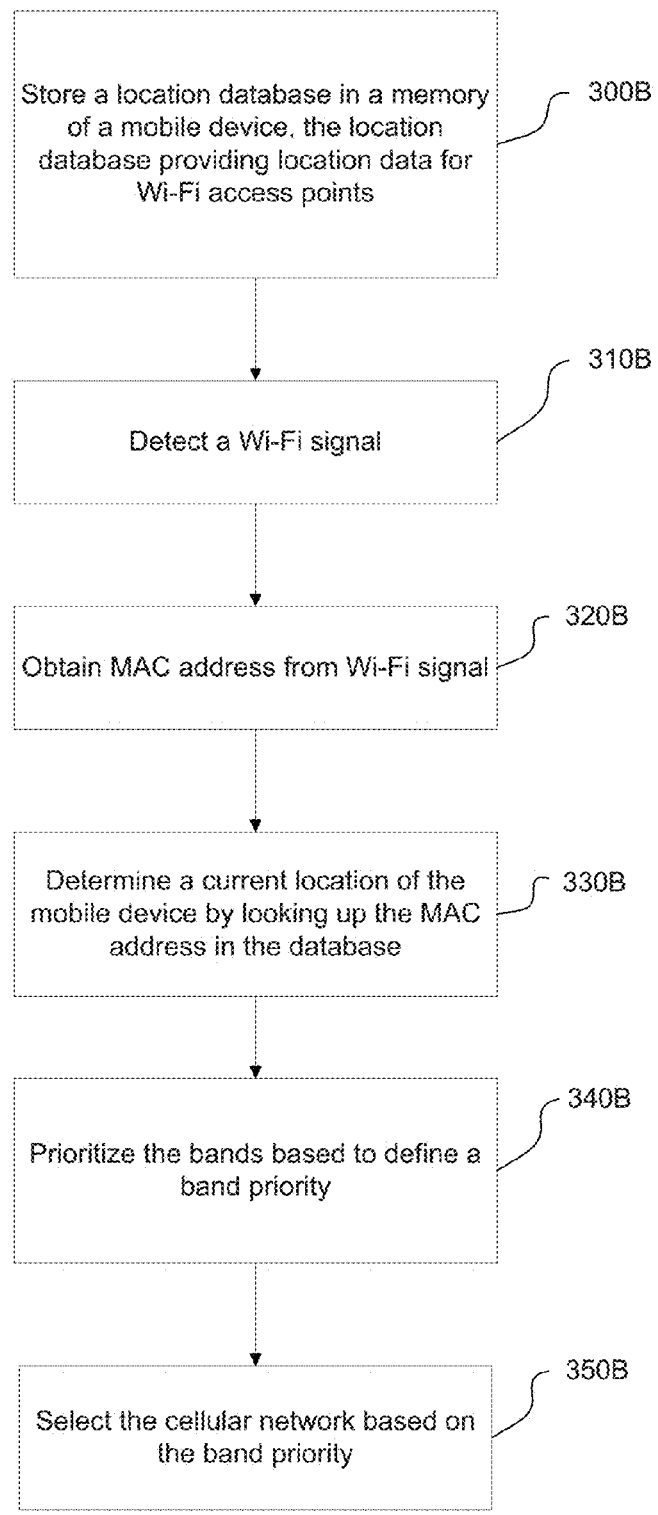
FIG. 3B is a flowchart outlining a method for selection of a cellular network using a location database of Wi-Fi access points and cell towers.

A network-selection method based on Wi-Fi is depicted by way of example in the flowchart of FIG. 3B. The method entails steps, acts or operations of storing (300B) a location database in a memory of a mobile device, the location database providing location data for Wi-Fi access points, detecting (310B) a Wi-Fi signal, obtaining (320B) a MAC address from the Wi-Fi signal, determining (330B) a current location of the mobile device by looking up the MAC address in the database, prioritizing (340B) the bands based on the current location to define a band priority, e.g. to create a set of prioritized bands, and selecting (350B) the cellular network based on the band priority.

The location database is, in one implementation, a geo-location database that includes entries of Wi-Fi Access Point MAC addresses and corresponding cellular tower identification information which includes the Mobile Country Code (MCC). This database is stored (e.g. pre-loaded or dynamically loaded) in the memory of the mobile device. In some embodiments, particularly in cases in which the mobile device has limited memory capacity, it may be more appropriate to store a subset of the database in the memory of the device. For example, the database may store key Wi-Fi access points, e.g. access points for airports. Storing airport access points would cover a large number of cases since most users turn off the cellular radiofrequency transceivers before a flight and then turn the transceiver back on after landing at the airport.

Upon power on (radio on), the mobile device initiates its standard (non-location prioritized) cellular system selection, while the Wi-Fi function is enabled to perform a passive scan to find the available wireless access points. Alternatively, an active scan involving a probe request and probe response may be used. Once the mobile device finds an AP, the mobile device retrieves the MAC address broadcasted in the beacon signal (i.e. in the 802.11-compliant beacon frame) to search for a matching mobile country code (MCC) in the stored database. The device continues the system selection algorithm if the MCC matches its current searching PLMN list. Otherwise, the current system selection algorithm is interrupted and the device starts a new search. The priority is given to the registered PLMN (RPLMN) list that matches the MCC. If no match is found in the RPLMN list, a new band search list is loaded based upon the MCC. The device starts a new system search on the new band list. If no match is found in the database, the Wi-Fi function is disabled and the device only performs searches on the cellular network.

Figure 4:
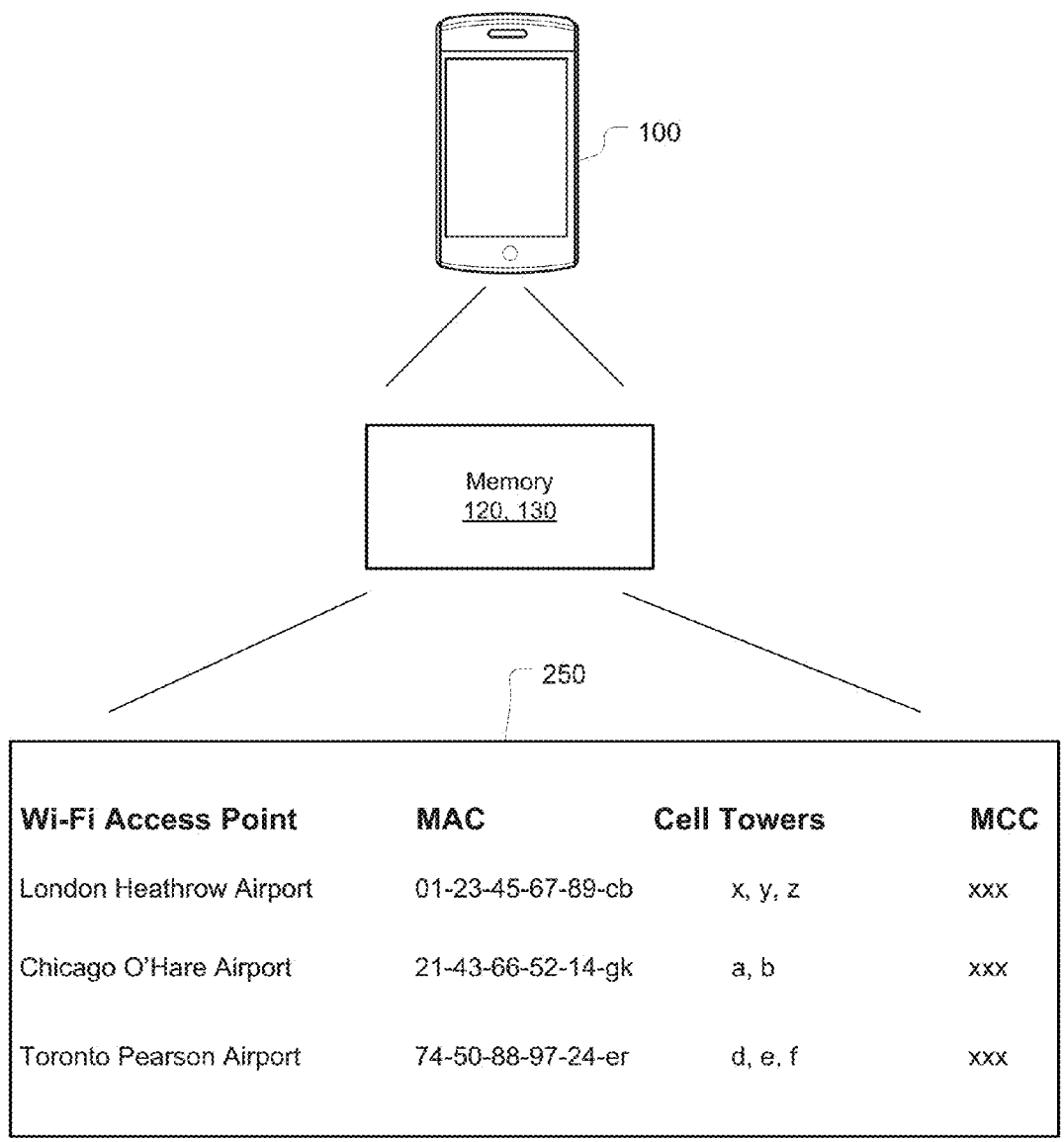
FIG. 4 is a depiction of a location database including medium access control (MAC) addresses of Wi-Fi access points and corresponding cell towers and associated mobile country codes.

FIG. 4 is a depiction of a location database 250 including location data for Wi-Fi access points (WAPs) and cell towers. In the illustrated embodiment, the location database is a single database stored in the memory 120, 130 of the mobile device 100. In the embodiment illustrated in FIG. 4, the database stores the access point name, MAC address (e.g. in a MAC-48 identifier format). In this embodiment, the database also stores the cell tower identification and mobile country code (MCC), the latter constituting the location information. Other information may be stored as well such as, for example, the mobile network operator, type of wireless communication (GSM, LTE, etc.), the broadcast signal power, etc.

Figure 5:
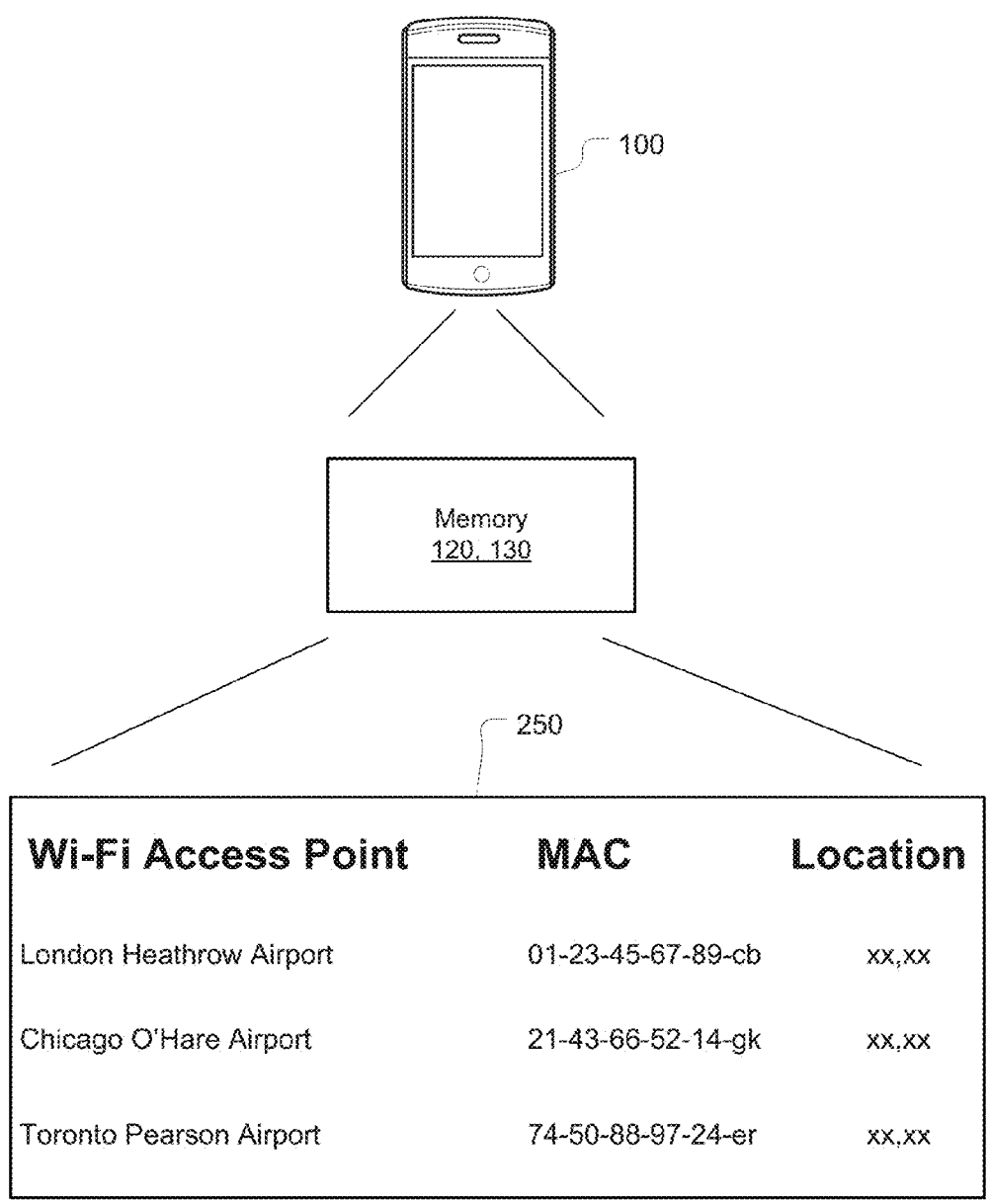
FIG. 5 is a depiction of a location database including location coordinates for the MAC addresses of Wi-Fi access points.

FIG. 5 depicts another implementation in which the MAC address of each WAP is stored in association with location coordinates. Note that in this particular example, the database does not need to have a MCC. However, in both FIG. 4 and FIG. 5, the MAC address is associated with location data of some sort that enables the mobile device to determine its current location and to use this current location for band reordering.

The location data in the database 250 may be stored as a collection of data in any suitable data structure, e.g. the data may be stored in computer registers, in a relational database as a table having a plurality of different fields and records. The table may be, for example, a look-up table as illustrated by way of example in FIGS. 4 and 5. Variants of this table may include other formats, arrangements, or data elements. The location data may be expressed as coordinates of latitude and longitude, although other location identifiers may be used, e.g. city, country, etc. This location data may also be formatted in any computer-readable format, e.g. binary values, ASCII or Extended Binary-Coded Decimal Interchange Code. Moreover, the data may include any information sufficient to identify the relevant information, such as descriptive text, codes, and/or pointers or references to data stored in other local or remote storage means.

The database(s) can be updated regularly to reflect any possible changes to the APs. The databases may be updated on a regular basis by pushing updates to the mobile device or in response to update requests sent by the mobile device. With the evolution of Wi-Fi and cellular database and the incremental increase in device memory capacity, more precise network information can be included in the database. The Radio Access Technology (RAT) combined with the absolute radio-frequency channel number (ARFCN) frequency can uniquely identify the cellular network. This information could be stored or loaded on the device with an associated MAC address. With this additional information, the mobile device could directly search the frequency and RAT to further accelerate the system selection process.

In some implementations, the current location is used to order the RATs. For example, the search order may place UMTS before LTE or vice versa. In a further implementation, the current location may be used to order a RAT/band combination. For example, a RAT/band prioritization may be as follows: UMTS band 4, LTE band 2, LTE band 7, etc.

In other implementations, the current location may be used to determine a list of prioritized frequencies (i.e. specific channels or channel numbers, e.g. EARFCN, UARFCN, ARFCN) and/or a list of prioritized base stations. In a further implementation, the current location may be used to order specific channels within a band, e.g. UARFCN 1037 for UMTS.

In other words, the network search may be based on a prioritization of bands and/or RATs. The prioritization may also be based on prioritized channel numbers or frequencies within the bands and/or based on prioritized PLMN ID's (MCC/MNC).

In a scenario in which the user of the mobile device has multiple SIM cards, e.g. a first SIM card for a home country and a second SIM card for a foreign country, the mobile device may store a first database for the first SIM card and a second database for the second SIM card. The mobile device may detect which SIM card is in the mobile device and then search the prioritized list corresponding to the SIM card.

The method may be further refined to avoid unnecessary scanning. In most cases, the mobile device should remain in the same geographic area when the user triggers a power on or radio on. In order to avoid unnecessary scanning, the mobile device may use a first timer T1 to reduce the number of unnecessary scans. For example, if a certain time, e.g. 60 minutes, has not elapsed between the events of the device powering off (or radio off) and the device powering up (or radio on), the device will not start the location detection. The mobile device can trigger a scan to detect its location after the certain time (e.g. 60 minutes) has elapsed between the same events. Optionally, a total scan timer T2 (second timer) may be defined to limit a total scan time. The scan should only last for this T2 timer and no background scan or back-off algorithm will be applied after T2 expires. Accordingly, the method may further entail applying a timer (e.g. timer T1) to require a threshold amount of time to elapse before performing the detecting of the broadcast signal and the obtaining of the current location from the database.

The method may be further refined by optimizing the scanning within Wi-Fi. In some embodiments, the Wi-Fi module may be capable of more than one band (such as 2.4 GHz, 5 GHz, or others). In one embodiment, to optimize its scanning procedure, the 2.4 GHz band which has only 11-14 channels is scanned first. Within the 2.4 GHz band, channels may be scanned in an optimized order as well. The 2.4 GHz band has more deployed access points than the 5 GHz band, and 5 GHz access points only exist as dual-band products (as 5 GHz-only devices are almost non-existent in the market). The 2.4 GHz band is fairly uniform in all countries, whereas the 5 GHz and other bands tend to be more regional.

In this method, the mobile device exploits knowledge of its current location to expedite the system selection upon powering on the device ("power on") or on activating the cellular radio transceiver ("radio on"), especially when the device travels to a different geographic region. This will save device battery life and improve the user experience.

It will be appreciated that the method is not restricted to cases where the device is powered on or the cellular radio is activated. This method may also apply to other cases, for example, when the mobile device is out of coverage for a long period of time and the device may travel to a different geographic region during this period. Wi-Fi could be used to periodically scan to detect an available network.

Although the present disclosure refers to Wi-Fi, it will be understood that this technology may be applied to any other short-range wireless technology that broadcasts a unique device identification code (e.g. a MAC address) in its beacon signal to enable a receiving device to look up the code in a database that correlates the codes with location data. Wi-Fi encompasses the IEEE 802.11 standard and all its drafts and amendments. In lieu of Wi-Fi, the short-range wireless technology may comprise Bluetooth, NFC, RFID, QR (Quick Response) code or other barcode, or any equivalent device having a MAC address or unique identifier that is linked to location information. In response to activation of a cellular transceiver, the Bluetooth, NFC, QR reader, barcode reader is activated to obtain a reading from which the location information is determined. The unique identifier (e.g. MAC or code) may be obtained by the mobile device by detecting a signal (Wi-Fi or Bluetooth) or reading an RFID tag, QR code or barcode. Obtaining the identifier enables the mobile device to recognize the identifier, to look up the identifier in the database and to determine the location of the mobile device. This location data enables the mobile device to select the cellular network.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of selecting a cellular network, the method comprising:
    storing a location database in a memory of a user equipment, the location database providing location data for one or more locations each identified by a unique identifier;
    determining a last time $T_{off}$ a radio of the user equipment was powered off;
    powering up the radio of the user equipment at a time $T_{on}$; and
    if the time lapsed between $T_{on}$ and $T_{off}$ is greater than a threshold, performing the steps of:
        detecting a Wi-Fi signal;
        obtaining a MAC address from the Wi-Fi signal;
        in response to obtaining the MAC address, determining a current location of the user equipment by looking up the MAC address as the identifier in the location database, wherein the location database comprises Wi-Fi Access Point MAC addresses and corresponding cellular tower identification information including a Mobile Country Code (MCC);
        reordering cellular network frequency bands based on the current location of the user equipment to define a band priority, wherein the reordering step comprises modifying the priority order of a Public Land Mobile Network (PLMN) list or a registered PLMN (RPLMN) list in dependence on the location of the user equipment; and
        selecting the cellular network frequency band based on the band priority.

2. The method as claimed in claim 1 wherein detecting the Wi-Fi signal comprises passively scanning for a Wi-Fi beacon signal broadcast by a Wi-Fi access point.

3. The method as claimed in claim 1 wherein detecting the Wi-Fi signal occurs in response to activating a cellular radiofrequency transceiver.

4. The method as claimed in claim 1 further comprising: limiting a total scan time for detecting the Wi-Fi signal.

5. A non-transitory computer-readable medium comprising instructions in code which when loaded into a memory and executed by a processor of a user equipment cause the user equipment to:
    store a location database in a memory of the user equipment, the location database providing location data for one or more locations each identified by a unique identifier;
    determine a last time $T_{off}$ a radio of the user equipment was powered off;
    power up the radio of the user equipment at a time $T_{on}$;
    if the time lapsed between $T_{on}$ and $T_{off}$ is greater than a threshold, perform the steps of:
        detecting a Wi-Fi signal;
        obtaining a MAC address from the Wi-Fi signal;
    in response to obtaining the MAC address, determining a current location of the user equipment by looking up the MAC address in the location database, wherein the location database comprises Wi-Fi Access Point MAC addresses and corresponding cellular tower identification information including Mobile Country Code (MCC);
    reordering cellular network frequency bands based on the current location of the user equipment to define a band priority, wherein reordering comprises modifying the priority order of a Public Land Mobile Network (PLMN) list or a registered PLMN (RPLMN) list in dependence on the location of the user equipment; and selecting the cellular network frequency band based on the band priority.

6. The computer-readable medium as claimed in claim 5 comprising code to cause the user equipment to passively scan for a Wi-Fi beacon signal broadcast by a Wi-Fi access point.

7. The computer-readable medium as claimed in claim 5 wherein the code to detect the Wi-Fi signal is executed in response to activating a cellular radiofrequency transceiver.

8. The computer-readable medium as claimed in claim 5 further comprising code for causing the user equipment to limit a total scan time for detecting the Wi-Fi signal.

9. A user equipment comprising:
a memory for storing a location database that includes location data for one or more locations each identified by a unique identifier;
a Wi-Fi receiver; and
a processor operatively coupled to the memory to:
determine a last time $T_{off}$ a radio of the user equipment was powered off;
power up the radio of the user equipment at a time $T_{on}$; and
if the time lapsed between $T_{on}$ and $T_{off}$ is greater than a threshold, perform the steps of:
detecting a Wi-Fi signal with the Wi-Fi receiver;
obtaining a MAC address from the Wi-Fi signal;
in response to obtaining the MAC address, determining a current location of the user equipment by looking up the MAC address as the identifier in the location database, the location database comprising Wi-Fi Access Point MAC addresses and corresponding cellular tower information including Mobile Country Code (MCC);
reordering cellular network frequency bands based on the current location of the user equipment to define a band priority by modifying the priority order of a Public Land Mobile Network (PLMN) list or a registered PLMN (RPLMN) list in dependent on the location of the user equipment; and
selecting the cellular network based on the band priority.

10. The user equipment as claimed in claim 9 wherein the Wi-Fi transceiver detects the Wi-Fi signal by scanning for a Wi-Fi beacon signal.

11. The user equipment as claimed in claim 9 wherein the processor initiates detection of the Wi-Fi signal in response to activating a cellular radiofrequency transceiver.

12. The user equipment as claimed in claim 9 wherein the processor is configured to limit a total scan time for detecting the Wi-Fi signal.

13. The user equipment as claimed in claim 9 wherein the location data base also includes prioritized Radio Access Technologies.

14. The user equipment as claimed in claim 9 wherein the location database also includes prioritized absolute radio-frequency channel numbers (ARFCN).

* * * * *